(12) United States Patent
Tabor et al.

(10) Patent No.: US 11,079,538 B2
(45) Date of Patent: Aug. 3, 2021

(54) FOVEAL IMAGE INVERTER

(71) Applicant: Schott Corporation, Elmsford, NY (US)

(72) Inventors: Kevin Tabor, Webster, MA (US); Paige Higby, Holland, MA (US); Paulette I. K. Onorato, Sudbury, MA (US)

(73) Assignee: Schott Corporation, Inc., Rye Brook, NY (US)

( * ) Notice: Subject to any disclaimer, the term of this patent is extended or adjusted under 35 U.S.C. 154(b) by 0 days.

(21) Appl. No.: 16/406,905

(22) Filed: May 8, 2019

(65) Prior Publication Data

US 2019/0302357 A1 Oct. 3, 2019

Related U.S. Application Data

(63) Continuation of application No. 15/410,727, filed on Jan. 19, 2017, now Pat. No. 10,288,803.

(60) Provisional application No. 62/441,491, filed on Jan. 2, 2017, provisional application No. 62/281,168, filed on Jan. 20, 2016.

(51) Int. Cl.
*G02B 6/06* (2006.01)
*G02B 6/44* (2006.01)

(52) U.S. Cl.
CPC .............. *G02B 6/06* (2013.01); *G02B 6/449* (2013.01)

(58) Field of Classification Search
CPC .................................. G02B 6/06; G02B 6/449
See application file for complete search history.

(56) References Cited

U.S. PATENT DOCUMENTS

| | | | | |
|---|---|---|---|---|
| 3,977,855 A | * | 8/1976 | Cole | C03B 37/15 65/410 |
| 4,767,430 A | * | 8/1988 | Deneka | G02B 6/4218 65/412 |
| 5,560,759 A | * | 10/1996 | Kortan | C03B 37/01268 65/388 |

(Continued)

OTHER PUBLICATIONS

Cizmar et al., Exploiting multimode waveguides for pure fibre-based imaging, naturecommunications | 3:1027 | DOI: 10.1038/ncomms2024 | www.nature.com/naturecommunications (Year: 2012).*

(Continued)

*Primary Examiner* — Peter Radkowski
(74) *Attorney, Agent, or Firm* — Louis J. Franco; Law Office of Louis J. Franco

(57) ABSTRACT

An image-conducting optical fiber bundle extends along a central bundle axis between image input and image output ends. The bundle is twisted along a portion of its length such that an image inputted into the image input end is angularly displaced about the central bundle axis before being outputted through the image output end. Each constituent optical fiber includes a cladding with a cladding diameter corresponding with the fiber diameter of that fiber and a core with a core diameter. The ratio of the core diameter to the cladding diameter defines a core-to-clad diameter ratio relative to each fiber. In various embodiments, at least one of fiber diameter and core-to-clad diameter ratio varies as a function of a fiber's radial displacement from the central bundle axis.

6 Claims, 4 Drawing Sheets

(56) References Cited

U.S. PATENT DOCUMENTS

| | | | | |
|---|---|---|---|---|
| 5,651,083 | A | * | 7/1997 | Kortan .............. C03B 37/01268 385/123 |
| 6,626,011 | B2 | * | 9/2003 | Chiquet ............ C03B 37/01211 65/388 |
| 2001/0045109 | A1 | * | 11/2001 | Chiquet ............ C03B 37/02754 65/388 |
| 2012/0040184 | A1 | * | 2/2012 | de Montmorillon ........................ C03B 37/01807 428/376 |

OTHER PUBLICATIONS

Gordon et al., Single-pixel phase-corrected fiber bundle endomicroscopy with lensless focussing capability, J Lightwave Technol. Aug. 15, 2015; 33(16): 3419-3425. doi:10.1109/JLT.2015.2436816. (Year: 2015).*

Pan, Jingsheng, Design and fabrication of a fiber optic image inverter based on a new high numerical aperture fiberoptic glasses system, Optoelectronic Imaging and Multimedia Technology, edited by Toru Yoshizawa, Ping Wei, Jesse Zheng, Tsutomu Shimura, Proc. of SPIE vol. 7850, 785006 (Year: 2010).*

Redding et al., High-resolution and broadband all-fiber spectrometers, Optica 1, 175-180 (2014) (Year: 2014).*

Thorlabs.com—Multimode Fiber Tutorial (Year: 2020).*

Porat et al., Widefield lensless endoscopy via speckle-correlations, Opt. Express 24, 16835-16855 (2016), Jan. 7, 2016, arXiv: 1601.01518v1 [physics.optics] (Year: 2016).*

Ford et al., Fibre imaging bundles for full-field optical coherence tomography, Measurement Science and Technology, 2007, vol. 18, No. 9, pp. 2949-2957. (Year: 2007).*

\* cited by examiner

*(Background Art)*

Average $R_{CC1}$ > Average $R_{CC2}$ > Average $R_{CC3}$ though bundles comprised of adjacently fused optical fibers is an established art. Image conduits such as inverters (i.e., image inverters), tapers and "straight-throughs" are well known to practitioners of the fiber optic arts. Fused optical fiber image conduits find broad application as components in such devices as night visions goggles, rifle scopes, x-ray detectors and medical imaging apparatuses, by way of non-limiting example.

FOVEAL IMAGE INVERTER

CROSS-REFERENCE TO RELATED APPLICATIONS/PRIORITY CLAIMS

The present application is a continuation of U.S. application Ser. No. 15/410,727 filed Jan. 19, 2017 under the title "FOVEAL IMAGE INVERTER," and for which an Issue Notification was issued on Apr. 24, 2019 indicating that application Ser. No. 15/410,727 will grant on Tuesday, May 14, 2019 as U.S. Pat. No. 10,288,803. Application Ser. No. 15/410,727 was co-pending with the present application on the date the present application was filed.

Previously filed Non-provisional application Ser. No. 15/410,727 was based on, and claimed the benefit of the filing dates of, two previous provisional applications. The first was Provisional Application Ser. No. 62/281,168 filed Jan. 20, 2016 under the title FOVEAL IMAGE INVERTER, while the second was Provisional Application Ser. No. 62/441,491 filed Jan. 2, 2017, also filed under the title FOVEAL IMAGE INVERTER. The present application also claims the benefit of the filing dates of Provisional Application Nos. 62/281,168 and 62/441,491 through Non-provisional application Ser. No. 15/410,727. Moreover, the entirety of the disclosures of all previous non-provisional and provisional applications, including the drawings, are incorporated herein by reference as if set forth fully in the present application.

BACKGROUND

The transmission of images and, more generally, electromagnetic waves, through bundles comprised of adjacently fused optical fibers is an established art. Image conduits such as inverters (i.e., image inverters), tapers and "straight-throughs" are well known to practitioners of the fiber optic arts. Fused optical fiber image conduits find broad application as components in such devices as night visions goggles, rifle scopes, x-ray detectors and medical imaging apparatuses, by way of non-limiting example.

The basic fabrication techniques of each of the examples listed above have process steps in common. For instance, the most basic of fused optical fiber image conduits is a one-to-one, linear conduit having an input (e.g., image receiving) end and an output (e.g., image emitting) end. Light reflected from an object adjacent the input end enters the input end as an image. The image is conducted through the conduit and exits the output end from which a detector device or human eye senses it. In a simple one-to-one conduit, the image exits the output end without intentional alteration. For instance, the image is not magnified, reduced or angularly displaced about the longitudinal axis of the conduit.

Referring to FIGS. 1A and 1B, as is known in the art, a basic one-to-one image conduit (FIG. 1A) is an intermediate product in the fabrication of an inverter (FIG. 1B). To fabricate an inverter, a one-to-one conduit is heated to an appropriate temperature. One end of the conduit in then angularly displaced (i.e., twisted) about the longitudinal axis of the conduit with respect to the opposite end. In the case of an inverter, the one end is twisted 180 degrees with respect to the other end. When properly controlled and executed, this process produces an inverter in which the original configuration of the face at each of the input and output ends is maintained, but in which one end is inverted with respect to the other. Accordingly, an image entering the image-receiving end is rotated as it is conducted through the constituent fibers within the fused bundle and exits the image-emitting end inverted.

It will be readily appreciated that, as the heated bundle is twisted to angularly displace about the longitudinal axis of the conduit one end with respect to the opposite end, constituent fibers within the bundle are stretched lengthwise. Moreover, fibers that are more toward the periphery of the bundle are stretched to a greater extent than fibers that are more centrally located. As a result, fibers more toward the periphery decrease in diameter more dramatically than do fibers more toward the center, particularly in central regions along their lengths. Because, according to traditional fabrication methods, the constituent fibers of the bundle are all of the same cross-sectional dimensions, peripheral fibers are sometimes stretched and constricted to such an extent that their ability to transmit light efficiently is negatively impacted, which results in undesired image effects, including vignetting. One way of avoiding image-degrading constriction of peripheral fibers is to twist the bundle the desired number of angular degrees over a longer bundle length. However, this results in bundles that may be too long, heavy and unwieldy for use in the intended environment or application.

Accordingly, a need exists for a fused fiber bundle and method of forming an inverter from the same that facilitates image inversion over a relatively short bundle length while obviating the undesired peripheral image degradation associated with previous fused-bundle image inverters.

SUMMARY

An illustrative embodiment of an imaging-conducting optical fiber bundle extends longitudinally along a central bundle axis between an image input end and an image output end. Between the opposed image input and output ends there extends a plurality of mutually and adjacently fused constituent optical fibers. Each constituent optical fiber has a first end coinciding with the image input end and a second end coinciding with the image output end. In various embodiments, each constituent optical fiber is configured as an imaging fiber capable of conveying an infinitesimal portion of an input image from the between the image input and image output ends. Moreover, the optical fiber bundle is twisted about the central bundle axis and along a portion of its length such that an image inputted into the image input end is angularly displaced about the central bundle axis before being outputted through the image output end.

In keeping with general convention, each constituent optical fiber includes an optically transmissive core about which there is collapsed and fused an optical cladding, the core and cladding having relative indices of refractive that facilitate propagation of electromagnetic waves through the core by means of total internal reflection. The cladding is defined by a cladding diameter that corresponds with the fiber diameter, while the core is defined by a core diameter. The ratio of the core diameter to the cladding diameter defines a core-to-clad diameter ratio relative to each fiber.

In some versions, the fiber diameters of the constituent optical fibers increase as a function of radial displacement from the central bundle axis. That is, as viewed into a selected cross-section of the bundle taken orthogonally to the central bundle axis, optical fibers more toward the outer boundary of the bundle have larger fiber diameters than do optical fibers more toward the central bundle axis.

In each of some alternative embodiments, the core-to-clad diameter ratios of the constituent optical fibers vary as a function of radial displacement from the central bundle axis. That is, optical fibers nearer the central bundle axis exhibit core-to-clad diameter ratios disparate by design from the core-to-clad diameter ratios of optical fibers situated more radially distant from the central bundle axis. In at least one version, as viewed into a cross-section of the bundle taken orthogonally to the central bundle axis, the core-to-clad diameter ratios of the plural constituent optical fibers are configured to decrease as a function of radial displacement from the central bundle axis. In still more specific alternative versions in which core-to-clad diameter ratios vary as a function of radial position relative to the central bundle axis, the fiber diameters of the constituent optical fibers may be configured, in one case, to remain constant as a function of radial displacement from the central bundle axis and, in another case, to vary as a function of radial displacement from the central bundle axis.

Representative embodiments are more completely described and depicted in the following detailed description and the accompanying drawings.

DETAILED DESCRIPTION

The following description of variously embodied foveal image inverters and methods of fabricating the same is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Figure 1A:
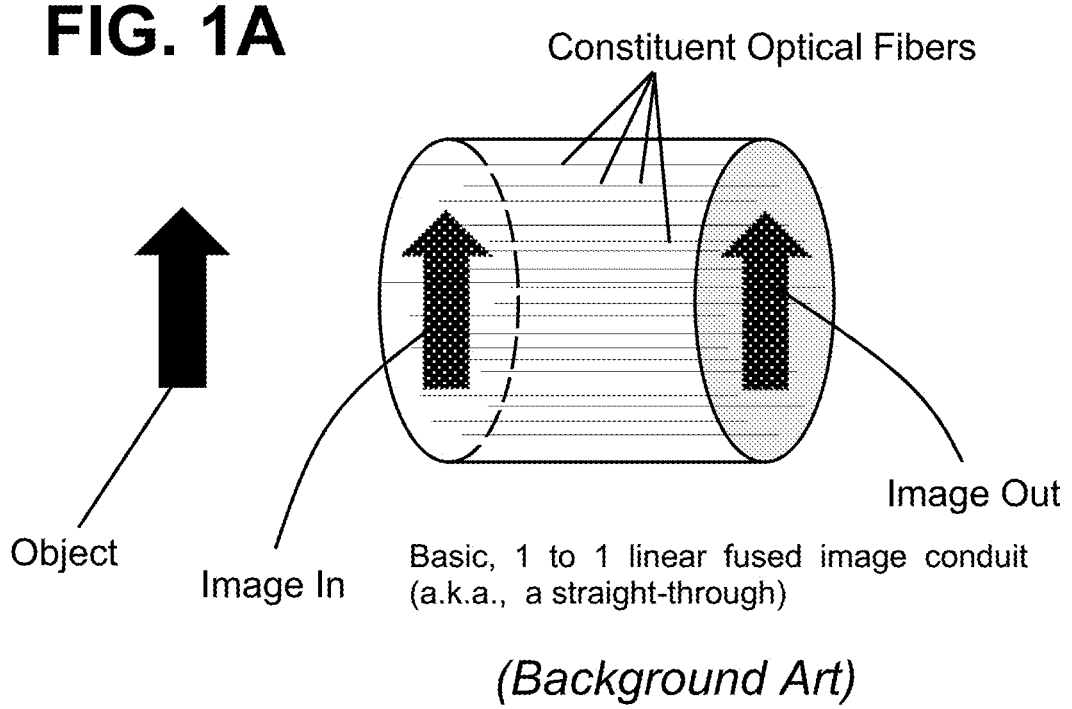
FIG. 1A depicts a linear fused image conduit of the existing art, which is also referred to as a "straight through;"
Figure 1B:
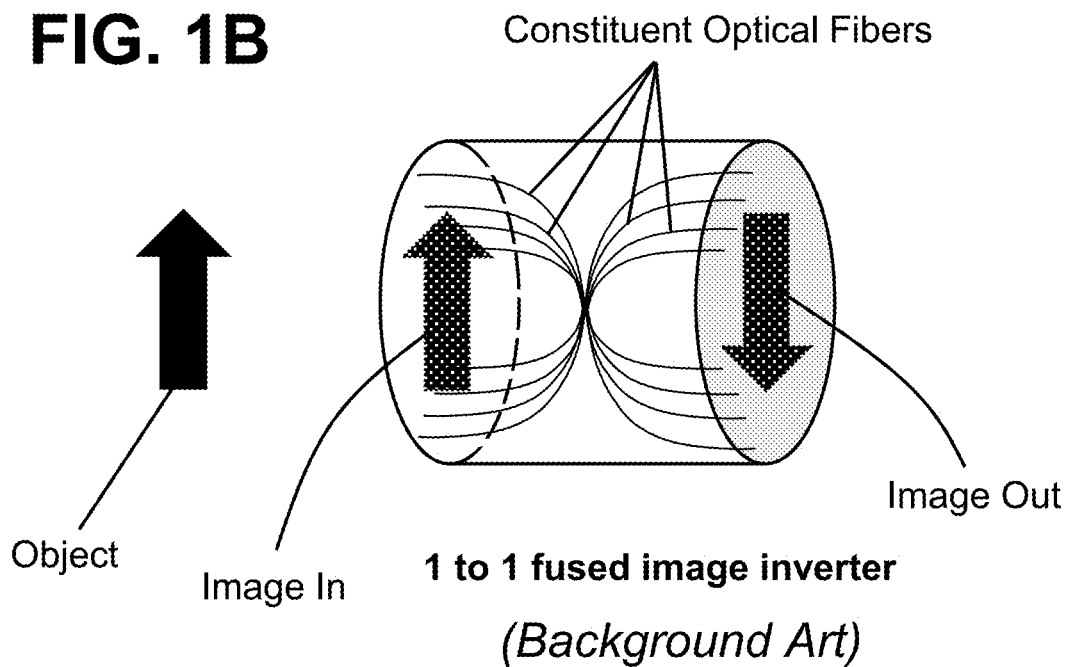
FIG. 1B shows a fused optical fiber image-inverting conduit of the existing art.

Many of the steps relative to the fabrication of a standard fused optical fiber bundle, including the special case of a fused-bundle image inverter, are applicable to the fabrication of optical fiber bundles and image inverters within the scope and contemplation of the present invention. These steps were summarized in the background with conjunctive reference to FIGS. 1A and 1B. Accordingly, principal reference is made to FIG. 2 for purposes of describing fundamental differences between standard fused optical fiber bundles, including standard fused-bundle image inverters, and foveal optical fiber bundles and image inverters within the scope and contemplation of the present invention as defined in the claims appended hereto. To the extent that the standard optical fiber bundles of FIGS. 1A and 1B include elements in common with embodiments within the scope of the invention, they may be referred to in order to support disclosure of the same.

Figure 2:
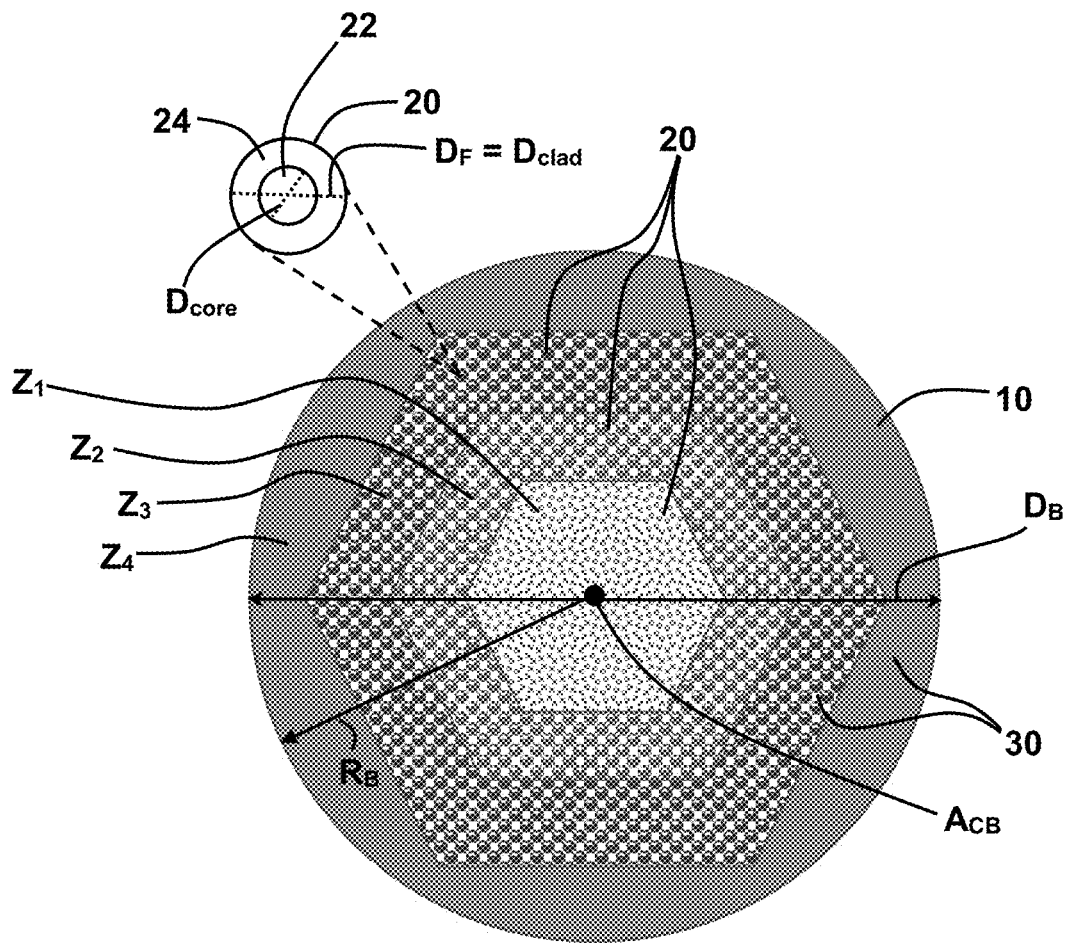
FIG. 2 schematically depicts a cross-section of an optical fiber bundle, including an image-inverting optical fiber bundle, embodying aspects of the present invention in which fiber diameter varies as a function of radial displacement from the central bundle axis.

Shown schematically in FIG. 2 is a cross-section of a rigid image-conducting optical fiber bundle 10 comprising a plurality of constituent optical fibers 20 and extending lengthwise along a central bundle axis $A_{CB}$ between image-input and image-output ends 16 and 18. Each optical fiber 20 includes a core 22 and a cladding 24 extending between a fiber first end 26 and a fiber second end 28 coinciding with, respectively, the image-input and image-output ends 26 and 28 of the optical fiber bundle 10.

In various aspects, the core 22 and the cladding 24 comprise optically-transmissive materials of differing indices of refraction, thereby facilitating internal reflection, as is known in the art. In alternative versions, at least one of the core 22 and cladding 24 comprises a glass. However, within the scope and contemplation of the invention are embodiments in which at least one of the core 22 and cladding 24 comprises a polymeric material (e.g., a plastic). In alternative variations in which at least one of the core 22 and cladding 24 is fabricated from a polymer, the cladding 24 and core 22 of each optical fiber 20 may be mutually joined or "fused" by, for example, heat fusion, as is typical of glass fibers, or by an alternative means such as an optical epoxy. Similar alternative methods may be used to join plural optical fibers 20 within the optical fiber bundle 10 to one another. In still additional versions, optical fibers 20 each of which comprises as least one of a glass and a polymer, may be retained in their respective positions within the overall optical fiber bundle 10 by a matrix 30 independent of the material from which the claddings 24 are formed. The matrix 30 could comprise, by way of example, a polymer, glass and/or optical epoxy.

Because a schematic cross-section is under consideration, it will be readily understood that the optical fiber bundle 10 could be either a straight-thru or an image inverter since planar cross-sections of these types of fused bundles could be indistinguishable. Moreover, while the constituent optical fibers 20 of the optical fiber bundle 10 in FIG. 2 are hexagonally packed, it is to be understood that the overall inventive concept encompasses numerous alternative fiber-packing arrangements, such as, by way of non-limiting example, circular/cylindrical, square, rectangular, etc., and that the packing arrangement is not at the precise point of novelty. A similar observation applies to the cross-sectional geometry of the constituent optical fibers 20 themselves. In fact, in addition to circular/cylindrical, square, rectangular, hexagonal, etc., at least one embodiment envisions use of five-sided fibers 20 in order to, in part, allow for the inclusion of interstitial EMA (extramural absorption) fibers among the optical fibers 20 within the bundle 10. Accordingly, and importantly, because the optical fibers 20 and bundles 10 may be of various cross-sectional geometries, the use of the term "diameter" not imply a circular cross-sectional geometry. More specifically, although "diameter" is frequently thought of narrowly as the longest chord that can be fitted within the curve defining a circle, the more technical mathematical definition of that term is applicable to this description and the appended claims. For instance, chords within squares, rectangles, hexagons, and even, irregular shapes are also diameters. Accordingly, nothing in the preceding explanation, the detailed description, the appended claims or the drawings should be construed to attribute to the term "diameter" a meaning more narrow than common usage and technical mathematical usage would attribute to them. Moreover, "radius" is in all cases, unless otherwise specified, as half the length of a given diameter.

Representative of the inventive concept is the inclusion with the optical fiber bundle 10 of a plurality of fiber zones $Z_1$ through $Z_x$ concentrically arranged about the central bundle axis $A_{CB}$, wherein $Z_1$ is the fiber zone located closest to and/or including the central bundle axis $A_{CB}$ and $Z_x$ is the "outermost" fiber zone (i.e, the fiber zone radially most distant from the central bundle axis $A_{CB}$). Moreover, the fiber zones $Z_1$ through $Z_x$ are populated by optical fibers 20, the fiber diameters $D_F$ of which are zone dependent. More specifically, the average overall fiber diameter $D_F$ of constituent optical fibers 20 within the first fiber zone $Z_1$ is smaller than the average overall fiber diameter $D_F$ of constituent optical fibers 20 within each fiber zone more radially distant from the $A_{CB}$. More generally, the average overall fiber diameter $D_F$ of the optical fibers 20 within each fiber zone is greater (larger) than the average overall fiber diameter $D_F$ of the optical fibers 20 within each fiber zone closer to the central bundle axis $A_{CB}$ and less (smaller) than the average overall fiber diameter $D_F$ of the optical fibers 20 within each fiber zone more radially distant from the central bundle axis $A_{CB}$.

By way of concrete non-limiting example, the illustrative optical fiber bundle 10 of FIG. 2 includes four "fiber zones" referenced as $Z_1$, $Z_2$, $Z_3$ and $Z_4$ (x=4 in this case). Fiber zone $Z_1$ (the innermost "central zone") includes optical fibers 20 having the smallest fiber diameters $D_F$ (e.g. 2.0-3.0 microns). Fiber zone $Z_2$ is the first zone concentrically disposed about fiber zone $Z_1$ and includes optical fibers 20 of incrementally larger fiber diameter $D_F$ (e.g. 3.0-6.0 microns) than the optical fibers 20 of fiber zone $Z_1$. Concentrically disposed about fiber zone $Z_2$ is fiber zone $Z_3$ which is comprised of optical fibers 20 of still larger fiber diameter $D_F$ (e.g., 6.0-10.0 microns). The outermost zone, fiber zone $Z_4$, which is concentrically disposed about fiber zone $Z_3$, includes optical fibers 20 with the largest overall fiber diameter $D_F$ in the bundle 10 (e.g. 10.0-12.0 microns).

Referring still to the cross-sectional view of FIG. 2, and most particularly the enlarged view of a constituent optical fiber 20, each optical fiber 20, regardless of the fiber zone $Z_1$ through $Z_x$ with which it is associated, has a core 22 with a core diameter $D_{core}$ and a cladding with a cladding diameter $D_{clad}$. Since, at least among some embodiments, it is the "outer diameter" of the cladding 24 that is relevant, and designated as the cladding diameter $D_{clad}$, the cladding diameter $D_{clad}$ may, in various aspects, be viewed as synonymous with the fiber diameter $D_F$. In any event, while the fiber diameters $D_F$ themselves increase as a function of fiber zone Z and bundle radius $R_B$, various embodiments are configured such that the core-to-clad diameter ratio $R_{CC}$, defined as $D_{core}/D_{clad}$, is held constant across fiber zones $Z_1$ through $Z_x$.

Another way of conceptualizing the core-to-clad diameter ratio $R_{CC}$ is in terms of the cross-sectional area of a constituent optical fiber 20 that each of the core 22 and cladding 24 of the same represents. For example, consider first and second optical fibers 20 with the same cladding diameter $D_{clad}$. If the first optical fiber 20 has a core diameter $D_{core}$ that is smaller than the core diameter $D_{core}$ of the second optical fiber 20, then the first optical fiber 20 has a smaller core-to-clad diameter ratio $R_{CC}$ than the second optical fiber 20. Expressed in alternative terms, for an optical fiber 20 of a given cladding diameter $D_{clad}$, an increase in the core diameter $D_{core}$ corresponds to the core 22 representing an increased percentage of the overall cross-sectional area of the optical fiber 20 and the cladding 24 representing a correspondingly decreased percentage of the cross-sectional area of the optical fiber 20.

Figure 2A:
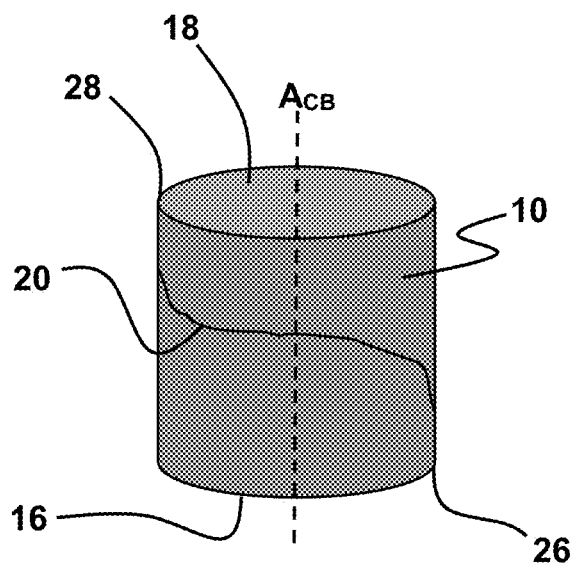
FIG. 2A is a side perspective view of an image-inverting optical fiber bundle fabricated in accordance with the present invention.

Relative to the formation of an optical fiber bundle 10 in which the output image is angularly displaced relative to the input image, it will be appreciated that an arrangement of optical fibers 20 to form a fiber bundle 10 such as that in FIGS. 2 and 2A facilitates a greater "twist rate" because the larger-diameter optical fibers 20 in the fiber zones more distant from the central bundle axis $A_{CB}$, while being elongated the most during the twist, are not constricted down to such a small fiber diameter $D_F$ that their light-transmission capabilities are negatively impacted. Because the "twist rate" can be much greater using the present solution, image-inverting optical fiber bundles 10 of much shorter overall length are rendered possible. Moreover, the resolution of the inverted image can be made constant across the bundle diameter $D_B$ by not degrading appreciably as a function of radial displacement from the central bundle axis $A_{CB}$.

In accordance with an alternative configuration, fiber diameter $D_F$ is held constant among and across fiber zones $Z_1$ through $Z_x$, while the core-to-clad diameter ratio $R_{CC}$ varies as a function of fiber zone Z. In one version, an innermost first fiber zone $Z_1$ comprises optical fibers 20 with a relatively high core-to-clad diameter ratio $R_{CC}$, an outermost third fiber zone $Z_3$ with a relatively low core-to-clad diameter ratio $R_{CC}$, and at one intermediate second fiber zone $Z_2$ situation between the innermost and outermost fiber zones $Z_1$ and $Z_3$ and comprising optical fibers 20 with a core-to-clad diameter ratio $R_{CC}$ between the core-to-clad diameter ratios $R_{CC}$ of the first and third fiber zones $Z_1$ and $Z_3$. In some such versions, the optical fibers 20 within each fiber zone Z are configured in accordance with a uniform specification to have the same core-to-clad diameter ratio $R_{CC}$ throughout the zone Z. However, in other variants, there is a mix within at least one fiber zone Z of optical fibers 20 having disparate core core-to-clad diameter ratios $R_{CC}$. Examples of two alternative configurations of bundles 10 having variable core core-to-clad diameter ratios $R_{CC}$ across fiber zones Z are discussed in further detail below with conjunctive reference to the schematically-represented bundle cross-sections shown in FIGS. 3 and 4.

Figure 3:
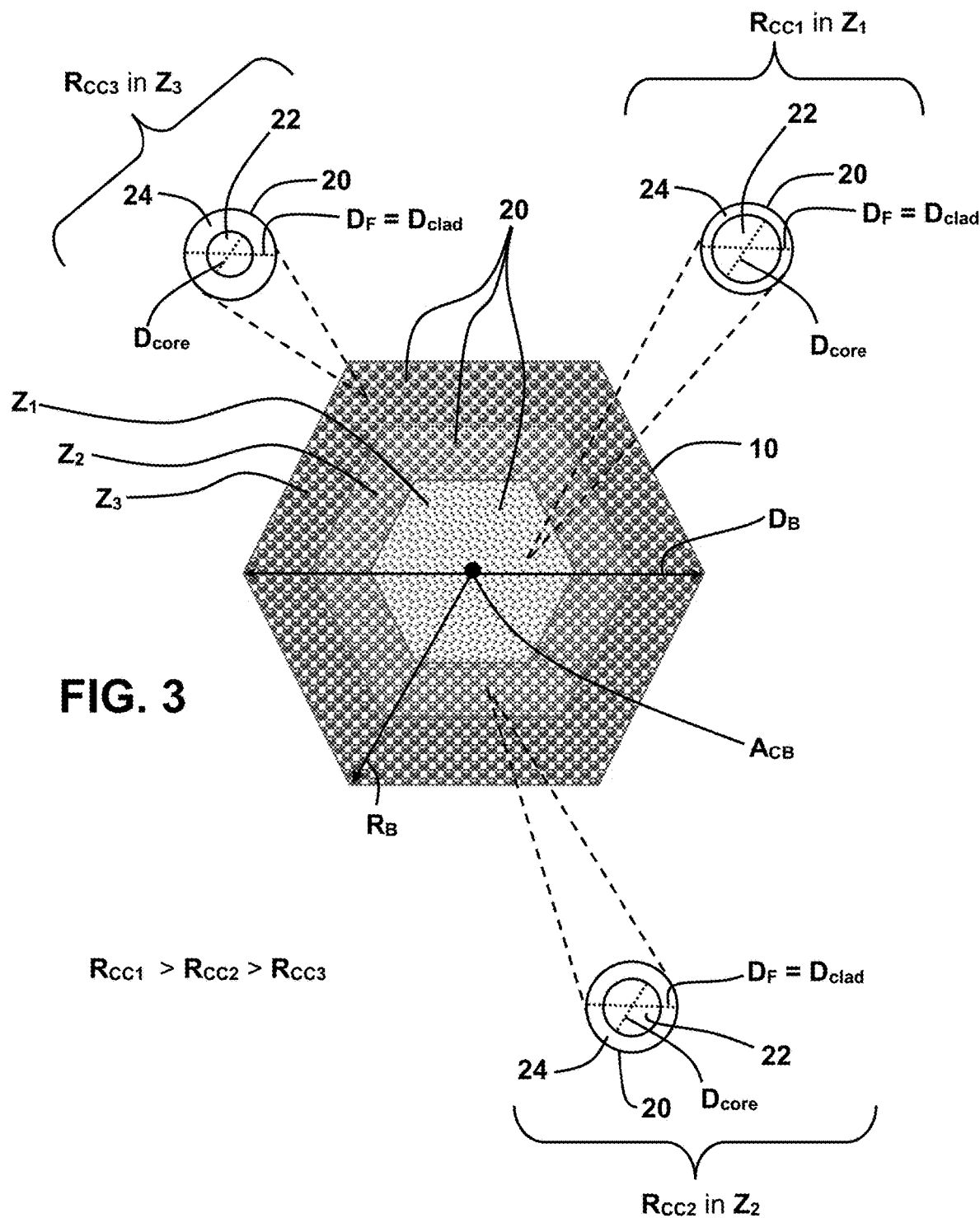
FIG. 3 is a schematic cross-section an image-inverting optical fiber bundle in which fiber diameter is constant but core diameter varies as a function of radial displacement from the central bundle axis.

Referring now to FIG. 3, there is shown a cross-section of a rigid image-conducting optical fiber bundle 10 comprising a plurality of constituent optical fibers 20 generally situated in first, second, and third fiber zones $Z_1$, $Z_2$, and $Z_3$. Within each fiber zone $Z_1$, $Z_2$, and $Z_3$ the core-to-clad diameter ratios $R_{CC}$ are constant, but they are disparate among the fiber zones Z. More specifically, within the first, second, and third fiber zones $Z_1$, $Z_2$, and $Z_3$, the core-to-clad diameter ratios $R_{CC}$ are, respectively, $R_{CC1}$, $R_{CC2}$, and $R_{CC3}$. In this particular case, the fiber diameters $D_F$ are constant across the entire bundle 10. That is, the cladding diameters $D_{clad}$ are constant among the first, second, and third fiber zones $Z_1$, $Z_2$, and $Z_3$ so that the variance in the core-to-clad diameter ratios $R_{CC1}$, $R_{CC2}$, and $R_{CC3}$ is attributable to variance among the core diameters $D_{core}$ across the first, second, and third fiber zones $Z_1$, $Z_2$, and $Z_3$. More specifically, as generally indicated in FIG. 3, although not precisely tied to any particular scale, the cores 22 of the optical fibers 20 in the first fiber zone $Z_1$ are configured with the largest core diameter $D_{core}$, the cores 22 of the optical fibers 20 in the second fiber zone $Z_2$ have the second-largest core diameter $D_{core}$, and cores 22 of the optical fibers 20 in the third fiber zone $Z_3$ have the smallest core diameter $D_{core}$. Given the constant cladding diameter $D_{clad}$ across all fiber zones Z, it follows that $R_{CC1} > R_{CC2} > R_{CC3}$ and indicated in FIG. 3.

Figure 4:
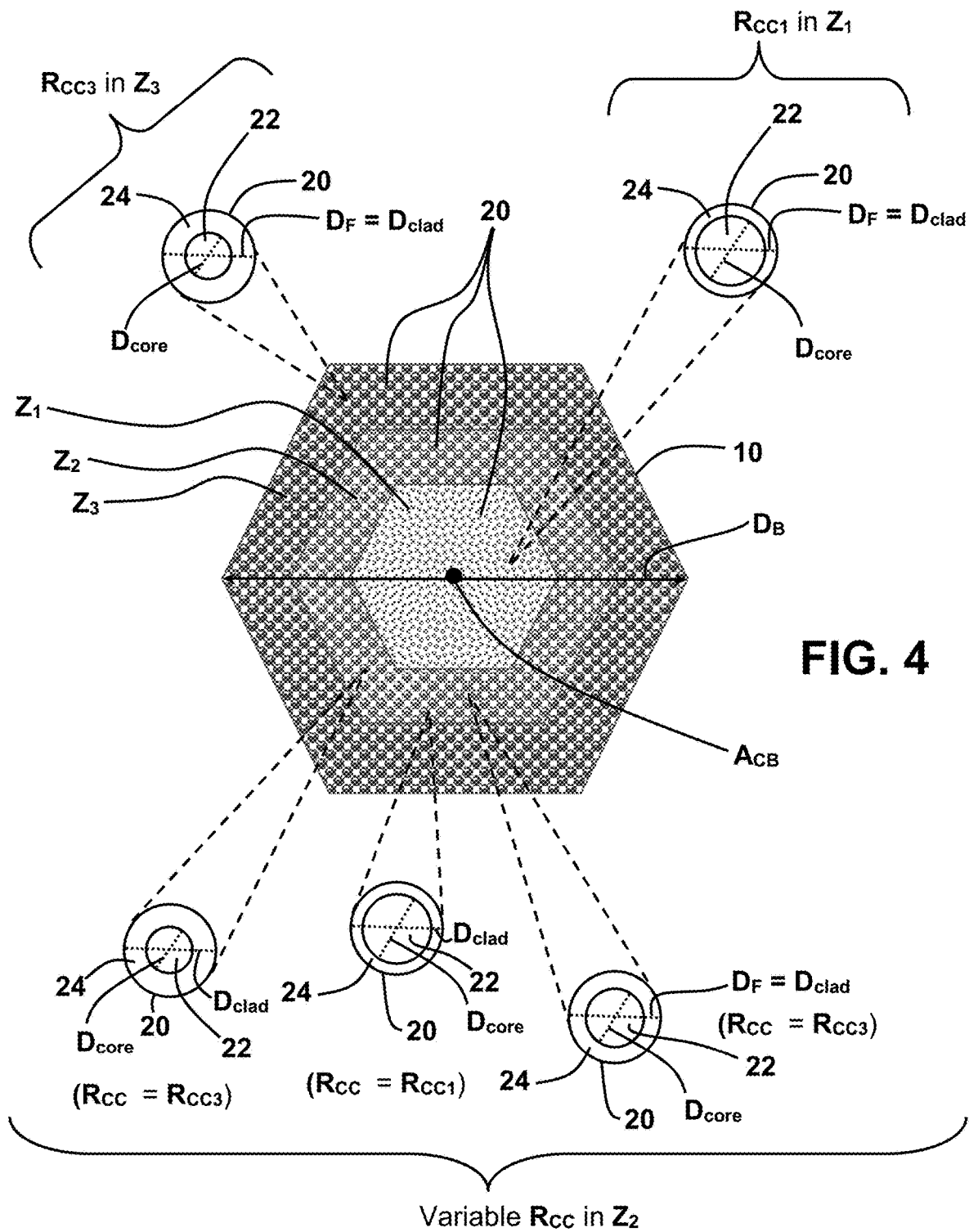
FIG. 4 is a schematic cross-sectional illustration of an alternative image-inverting optical fiber bundle in which fiber diameter is constant but core diameter varies as a function of radial displacement from the central bundle axis.

With reference to FIG. 4, another variation of an embodiment with various core-to-clad diameter ratios $R_{CC}$ is briefly described. Although numerous permutations within the overall scope and contemplation of the invention are possible, a broader overall concept is represented more simplistically through a discussion of FIG. 4. Like the illustrative example of FIG. 3, the example of FIG. 4 generally includes first, second, and third fiber zones $Z_1$, $Z_2$, and $Z_3$. Moreover, as with the example of FIG. 3, and in order to keep the example manageable and simple, the cladding diameters $D_{clad}$ are constant among the first, second, and third fiber zones $Z_1$, $Z_2$, and $Z_3$ so that any variance in the core-to-clad diameter ratios $R_{CC}$ among optical fibers 20 is attributable to variance among the core diameters $D_{core}$.

A key difference between the examples of FIGS. 4 and 3 is that, in the example of FIG. 4, there is, by design, a variance in the core-to-clad diameter ratio $R_{CC}$ within at least an intermediate zone (e.g., fiber zone $Z_2$ in this case). While there may be some variance in the core-to-clad diameter ratio $R_{CC}$ within each of the fiber zones Z, or across some radially-dependent gradient, for simplicity, a variance within only fiber zone $Z_2$ is considered. While the first fiber zone $Z_1$ includes only optical fibers 20 with a first core-to-clad diameter ratio $R_{CC1}$ and the third fiber zone $Z_3$ includes only optical fibers 20 with a third core-to-clad diameter ratio $R_{CC3}$ lesser in magnitude than the first core-to-clad diameter ratio $R_{CC1}$, the second fiber zone $Z_2$ includes a mixture of core-to-clad diameter ratios $R_{CC}$. In this particular case, as illustrated by the three demonstrative fiber cross-sections just above the bracket labeled "Variable $R_{CC}$ in $Z_2$," there are within fiber zone $Z_2$ optical fibers 20 characterized by the first, second, and third core-to-clad diameter ratios $R_{CC1}$, $R_{CC2}$, and $R_{CC3}$. Whereas the second core-to-clad diameter ratio $R_{CC2}$ is unique to the second fiber zone $Z_2$ in this configuration, as previously mentioned, the first fiber zone $Z_1$ is populated entirely by optical fibers 20 of the first core-to-clad diameter ratio $R_{CC1}$, while the third fiber zone $Z_3$ is populated entirely by optical fibers 20 of the third core-to-clad diameter ratio $R_{CC3}$.

Whether or not the second fiber zone $Z_2$ of any particular embodiment includes fibers 20 of a second core-to-clad diameter ratio $R_{CC2}$ unique to the second fiber zone $Z_2$, the inclusion within the second fiber zone $Z_2$ of a mixture of optical fibers 20 exhibiting both the first and third core-to-clad diameter ratio $R_{CC1}$ and $R_{CC3}$ results in a smoother, less obvious transition between fibers 20 of the first and third fiber zones $Z_1$ and $Z_3$. Optical fibers 20 of disparate core-to-clad diameter ratio $R_{CC}$ may be randomly distributed in the second fiber zone $Z_2$ or well ordered. In at least one configuration, the inclusion within the second fiber zone $Z_2$ of optical fibers 20 of the first core-to-clad diameter ratio $R_{CC1}$ is more dense nearer the first fiber zone $Z_1$, while the inclusion in the second fiber zone $Z_2$ of optical fibers 20 of the third core-to-clad diameter ratio $R_{CC3}$ is more dense nearer the third fiber zone $Z_3$ thereby defining a sort of radially-dependent inclusion gradient of disparate core-to-clad diameter ratios $R_{CC}$ within the bundle 10. In addition to avoiding visible "steps" between fiber zones Z, the inclusion of optical fibers 20 of disparate core-to-clad diameter ratio $R_{CC}$ in different concentrations across the cross-section of the bundle 10 in accordance with a radial gradient mitigates structural stresses associated with the heating, drawings and twisting steps, and with the differing effects of thermal expansion on disparate fiber types.

Because variances in core-to-clad diameter ratios $R_{CC}$ even within each fiber zone Z are envisioned, it may be useful to conceptualize the core-to-clad diameter ratio $R_{CC}$ within any particular fiber zone Z as representative of an average core-to-clad diameter ratio $R_{CC}$ applicable to that zone, and the averages among all fiber zones Z as decreasing with radial displacement from the central bundle axis $A_{CB}$. In accordance with this conceptualization, FIG. 4 indicates that "average $R_{CC1}$>average $R_{CC2}$>average $R_{CC3}$. In a manner similar to integration in calculus, as the number of annular fiber zones Z becomes very large, and the annular thickness of each fiber zone Z becomes very small, the more arbitrary the designation of individual fiber zones Z becomes, and the radially dependent gradient fiber inclusion becomes increasingly "smooth."

Beyond the preceding, it is to be understood that, within any given configuration, variances in overall fiber diameter $D_F$ and core-to-clad diameter ratios $R_{CC}$ are not mutually exclusive. More specifically, while the description up to the present has considered alternative configurations in which, on the one hand, fiber diameter $D_F$ varies as a function of radial displacement from the central bundle axis $A_{CB}$ while core-to-clad diameter ratio $R_{CC}$ is constant across the bundle 10 and, on the other hand, fiber diameter $D_F$ is constant across the bundle 10 while core-to-clad diameter ratio $R_{CC}$ varies as a function of radial displacement from the central bundle axis $A_{CB}$, expressly within the scope and contemplation of the invention are bundle configurations in which both fiber diameter $D_F$ and core-to-clad diameter ratio $R_{CC}$ varies as a function of radial displacement from the central bundle axis $A_{CB}$.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A rigid image-conducting optical fiber bundle having an image input end and an image output end, the bundle comprising:

a plurality of adjacently fused constituent optical fibers, each optical fiber having a first end coinciding with the image input end and a second end coinciding with the image output end, wherein (i) the bundle extends longitudinally along a central bundle axis;

(ii) the bundle includes a plurality of at least two fiber zones including at least a first fiber zone and a second fiber zone, the first and second fiber zones being concentrically arranged about the central bundle axis and defined such that (a) the first fiber zone is nearer the central bundle axis than is the second fiber zone and (b) the average overall fiber diameter of constituent optical fibers within the first fiber zone is smaller than the average overall fiber diameter of constituent optical fibers within the second fiber zone; and (iii) the bundle is twisted along a portion of its length about the central bundle axis such that an image inputted into the image input end is angularly displaced about the central bundle axis before being outputted through the image output end.

2. The optical fiber bundle of claim 1 wherein the bundle is twisted 180 degrees over the length thereof about the central bundle axis such that the image outputted through the image output end is inverted relative to the corresponding image inputted into the image input end, thereby defining an image inverter.

3. The image inverter of claim 2 wherein (i) each constituent optical fiber includes a core with a core diameter and a cladding with a cladding diameter, the ratio of the core diameter to the cladding diameter defining a core-to-clad diameter ratio relative to that fiber and (ii) the core-to-clad diameter ratios of the plural constituent optical fibers are configured to not vary as a function of fiber zone.

4. The optical fiber bundle of claim 1 wherein (i) each constituent optical fiber includes a core with a core diameter and a cladding with a cladding diameter, the ratio of the core diameter to the cladding diameter defining a core-to-clad diameter ratio relative to that fiber and (ii) the core-to-clad diameter ratios of the plural constituent optical fibers are configured to not vary as a function of fiber zone.

5. The optical fiber bundle of claim 4 wherein at least one of the core and the cladding comprises a polymeric material.

6. The optical fiber bundle of claim 1 wherein at least one of the core and the cladding comprises a polymeric material.

\* \* \* \* \*